(12) United States Patent  
Mizuno

(10) Patent No.: US 10,290,863 B2  
(45) Date of Patent: May 14, 2019

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Tomoyuki Mizuno, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 180 days.

(21) Appl. No.: 15/521,117

(22) PCT Filed: Oct. 22, 2015

(86) PCT No.: PCT/IB2015/001955  
§ 371 (c)(1),  
(2) Date: Apr. 21, 2017

(87) PCT Pub. No.: WO2016/063120  
PCT Pub. Date: Apr. 28, 2016

(65) Prior Publication Data  
US 2018/0013136 A1 Jan. 11, 2018

(30) Foreign Application Priority Data  
Oct. 22, 2014 (JP) .................................. 2014-215579

(51) Int. Cl.  
*H01M 4/36* (2006.01)  
*H01M 10/0525* (2010.01)  
(Continued)

(52) U.S. Cl.  
CPC ........... *H01M 4/364* (2013.01); *H01M 4/131* (2013.01); *H01M 4/366* (2013.01); *H01M 4/483* (2013.01);  
(Continued)

(58) Field of Classification Search  
CPC ......... H01M 10/0525; H01M 10/0587; H01M 2004/021; H01M 4/131; H01M 4/364;  
(Continued)

(56) References Cited

U.S. PATENT DOCUMENTS

2010/0255352 A1 10/2010 Inagaki et al.  
2012/0270093 A1* 10/2012 Isozaki ................. H01M 4/131  
429/156

FOREIGN PATENT DOCUMENTS

CN 202839843 U 3/2013  
JP 2013-077398 A 4/2013  
(Continued)

*Primary Examiner* — Lingwen R Zeng  
(74) *Attorney, Agent, or Firm* — Sughrue Mion, PLLC

(57) ABSTRACT

A nonaqueous electrolyte secondary battery includes a positive electrode, a nonaqueous electrolytic solution, and a negative electrode. The negative electrode includes a negative electrode current collector and a negative electrode active material layer which is formed on the negative electrode current collector. The negative electrode active material layer has a first region and a second region. The first region is a region formed on a surface of the negative electrode current collector and contains lithium titanium composite oxide as a major component. The second region is a region including a surface of the negative electrode active material layer and contains lithium titanium composite oxide as a major component and further contains silicon oxide.

7 Claims, 4 Drawing Sheets

(51) Int. Cl.
*H01M 4/131* (2010.01)
*H01M 4/48* (2010.01)
*H01M 4/485* (2010.01)
*H01M 10/0587* (2010.01)
*H01M 4/02* (2006.01)

(52) U.S. Cl.
CPC ....... *H01M 4/485* (2013.01); *H01M 10/0525* (2013.01); *H01M 10/0587* (2013.01); *H01M 2004/021* (2013.01); *Y02T 10/7011* (2013.01)

(58) Field of Classification Search
CPC ...... H01M 4/366; H01M 4/483; H01M 4/485; Y02T 10/7011
See application file for complete search history.

(56) References Cited

FOREIGN PATENT DOCUMENTS

| | | |
|---|---|---|
| JP | 2013-246900 A | 12/2013 |
| WO | 2011/108106 A1 | 9/2011 |

* cited by examiner

NONAQUEOUS ELECTROLYTE SECONDARY BATTERY

CROSS REFERENCE TO RELATED APPLICATIONS

This application is a National Stage of International Application No. PCT/IB2015/001955 filed Oct. 22, 2015, claiming priority based on Japanese Patent Application No. 2014-215579 filed Oct. 22, 2014, the contents of all of which are incorporated herein by reference in their entirety.

BACKGROUND OF THE INVENTION

1. Field of the Invention

The present invention relates to a nonaqueous electrolyte secondary battery. Specifically, the invention relates to a nonaqueous electrolyte secondary battery containing lithium titanium composite oxide as a negative electrode active material.

2. Description of Related Art

Recently, a nonaqueous electrolyte secondary battery such as a lithium ion secondary battery or a nickel metal hydride battery has been used as a so-called portable power supply for a PC, a portable device, or the like or as a drive power supply for a vehicle. In particular, a light-weight lithium ion secondary battery capable of obtaining high energy density is preferably used as a high-output power supply for driving a vehicle such as an electric vehicle or a hybrid vehicle. In a typical configuration of the battery, a positive electrode, a negative electrode, and a nonaqueous electrolytic solution are accommodated in a battery case. The positive electrode and the negative electrode include active material layers that are formed on corresponding current collectors and contain, as a major component, active materials capable of reversibly storing and releasing charge carriers (typically, lithium ions). The battery is charged and discharged by the charge carrier moving between the positive and negative electrodes.

In a nonaqueous electrolyte secondary battery which is used as a drive power supply for a vehicle, further improvement in performance is required to stably supply a high current. As a negative electrode active material of the battery, in the related art, techniques of using a carbon material such as graphite or lithium titanium composite oxide (LTO, for example, $Li_4Ti_5O_{12}$) are known (for example, refer to Japanese Patent Application Publication No. 2013-246900 (JP 2013-246900 A), Japanese Patent Application Publication No. 2013-077398 (JP 2013-077398 A), and Japanese Patent Application Publication No. 2011-108106 (JP 2011-108106 A)).

SUMMARY OF THE INVENTION

In a negative electrode in which a carbon material is used, the porosity of a negative electrode active material layer can be easily set to be high. Therefore, a battery having relatively high input and output characteristics and a relatively small resistance increase can be realized. Conversely, since the carbon material has a relatively low action potential, there is a problem in that the reduction decomposition of an electrolytic solution or the deactivation of charge carriers (for example, Li) is likely to occur. On the other hand, LTO has no change in crystal structure caused by the storage and release of charge carriers and has a higher action potential than a carbon material. Therefore, the reduction decomposition of an electrolytic solution or the deactivation of charge carriers (for example, Li) is not likely to occur. Thus, a battery having a relatively high capacity retention and high safety can be realized.

However, since the action potential is high (1.55 V vs. $Li/Li^+$), LTO may be more disadvantageous in terms of energy density than a carbon material (for example, a reduction potential is 0.1 V vs. $Li/Li^+$). Therefore, in order to realize high-rate charging and discharging, it is necessary to reduce the particle size of LTO and to increase the thickness of a negative electrode active material layer. In such a configuration, high energy density is realized in an initial stage of use of a battery; however, after a long period of use of the battery, the energy density may deteriorate, or the input and output characteristics may deteriorate due to an increase in diffusion resistance.

The invention provides a nonaqueous electrolyte secondary battery in which LTO is used as a negative electrode active material, the battery capable of stably securing high energy density over a long period of time.

The present inventors performed a study regarding the reason for the above-described performance deterioration and found the following points. In a negative electrode in which LTO is used as a negative electrode active material, the density of a negative electrode active material layer is high, and thus charge carriers on a surface of the negative electrode active material layer are preferentially consumed during high-rate charging and discharging. As a result, non-uniformity in the concentration (salt concentration) of charge carriers is likely to occur in a thickness direction of the negative electrode active material layer. Although also observed in a negative electrode in which a carbon material is used, such a phenomenon is more significant in a negative electrode in which LTO is used, whose negative electrode active material layer has a larger thickness and higher density than the negative electrode active material layer of the negative electrode in which a carbon material is used. The present inventors performed a thorough study in order to discover means for solving the above-described problems, thereby completing the invention.

According to an aspect of the invention, there is provided a nonaqueous electrolyte secondary battery including a positive electrode, a nonaqueous electrolytic solution, and a negative electrode. The negative electrode includes a negative electrode current collector and a negative electrode active material layer which is formed on the negative electrode current collector. The negative electrode active material layer has a first region and a second region. The first region is a region formed on a surface of the negative electrode current collector and contains lithium titanium composite oxide as a major component. The second region is a region including a surface of the negative electrode active material layer and contains lithium titanium composite oxide as a major component and further contains silicon oxide.

According to the above-described configuration, the negative electrode active material layer contains lithium titanium composite oxide as a major component. Therefore, a battery having a long service life and high safety can be realized. In addition, the region including the surface of the negative electrode active material layer contains silicon oxide. Silicon oxide has a large volume change caused by the storage and release of charge carriers and forms a space, which is expandable in volume, on the periphery thereof during repeated charging and discharging. That is, even when relatively small lithium titanium composite oxide is used, a space for storing an electrolytic solution can be formed after a given period of use (charging and discharging). As a result, a large amount of electrolyte can be supplied to a region near the surface of the negative electrode active material layer where the salt concentration is likely to be low, a variation in salt concentration in the thickness direction of the negative electrode active material layer is suppressed, and a battery having improved input and output characteristics is realized. Further, a battery structure capable of realizing high energy density not only in an initial stage of use but also after a long period of use can be provided.

In the above-described aspect, a ratio of an average thickness of the second region to an average thickness of the negative electrode active material layer may be 1% to 50%.

With the above-described configuration, a variation in the salt concentration of the negative electrode active material layer can be more efficiently suppressed.

In the above-described aspect, a content of lithium titanium composite oxide in the second region and a content of silicon oxide in the second region may satisfy the following relationship.

$$1 \leq M^2_{SiO}/(M^2_{LTO}+M^2_{SiO}) \times 100 \leq 7$$

$M^2_{LTO}$ represents the content of lithium titanium composite oxide in the second region in terms of mass %, and $M^2_{SiO}$ represents the content of silicon oxide in the second region in terms of mass %.

With the above-described configuration, a decrease in capacity is suppressed, and input and output characteristics can be improved.

In the above-described aspect, the mass per unit area of the negative electrode active material layer in the first region may be 30 mg/cm² to 50 mg/cm².

In a negative electrode active material layer in which a high coating weight is realized, a variation in salt concentration is likely to occur, particularly, in a thickness direction. The above-described aspect is particularly efficient in a battery in which a high coating weight is designed.

In the above-described aspect, an overall density of the negative electrode active material layer may be 2 g/cm³ to 3 g/cm³.

In a negative electrode active material layer in which a high density is realized, a variation in salt concentration is likely to occur, particularly, in a thickness direction. The above-described aspect is particularly efficient in a battery in which a high density is designed.

In the above-described aspect, the first region may contain silicon oxide, and a content of silicon oxide in the first region and $M^2_{SiO}$ may satisfy the following relationship.

$$M^1_{SiO} < M^2 SiO$$

$M^1_{SiO}$ represents the content of silicon oxide in the first region in terms of mass %.

In the above-described aspect, as long as $M^1_{SiO} < M^2_{SiO}$ is satisfied, the effects can be obtained even in a case where the first region contains SiO.

In the above-described aspect, the content of silicon oxide in the first region (R1) may be zero.

In the above-described aspect, characteristics of lithium titanium composite oxide having high potential and superior thermal stability can be utilized.

As described above, the nonaqueous electrolyte secondary battery (for example, a lithium ion secondary battery) disclosed herein can exhibit high input and output performance, safety, and long service life. Due to these characteristics, the nonaqueous electrolyte secondary battery disclosed herein can be preferably used as, for example, a power source (drive power supply) for a vehicle. Moreover, this battery can exhibit high energy density with a relatively low battery capacity and thus can contribute to reduction in the size and weight of a drive power supply.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
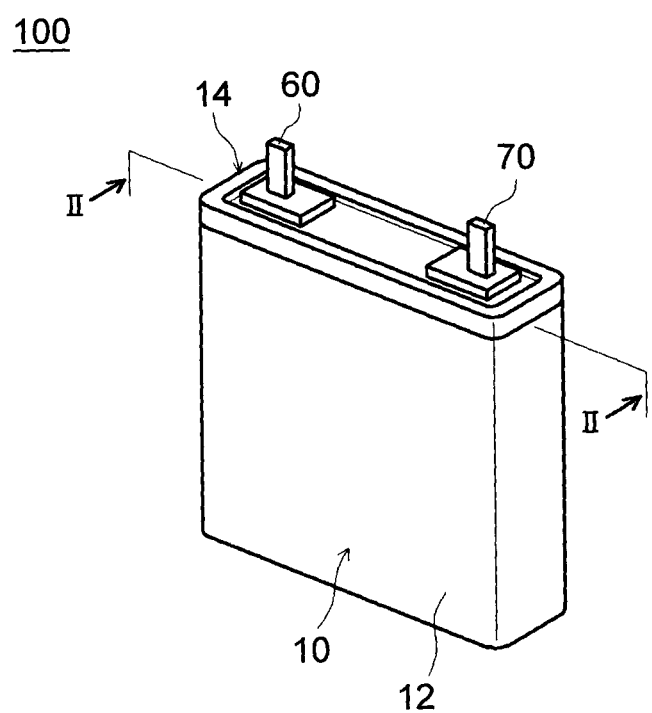
FIG. 1 is a perspective view schematically showing the external appearance of a nonaqueous electrolyte secondary battery according to an embodiment of the invention.

Hereinafter, preferred embodiments of the invention will be described with reference to the drawings. Parts or portions having the same function are represented by the same reference numerals. In each drawing, a dimensional relationship (for example, length, width, or thickness) does not reflect the actual dimensional relationship. Matters necessary to implement the embodiments of the invention other than those specifically referred to in this specification may be understood as design matters based on the related art in the pertinent field for a person of ordinary skills in the art. The invention can be practiced based on the contents disclosed in this description and common technical knowledge in the subject field.

In this specification, "nonaqueous electrolyte secondary batteries" refer to all the batteries which can be repeatedly charged and discharged by using an nonaqueous electrolytic solution as an electrolyte. Examples of "the nonaqueous electrolyte secondary batteries" include secondary batteries in which lithium ions (Li ions) or sodium ions (Na ions) are used as electrolyte ions (charge carriers), the batteries are charged and discharged by the movement of charges between positive and negative electrodes along with the Li ions or Na ions. Batteries which are generally called lithium ion batteries or lithium secondary batteries are typical examples included in the nonaqueous electrolyte secondary battery of this specification.

[Nonaqueous Electrolyte Secondary Battery]

Figure 2:
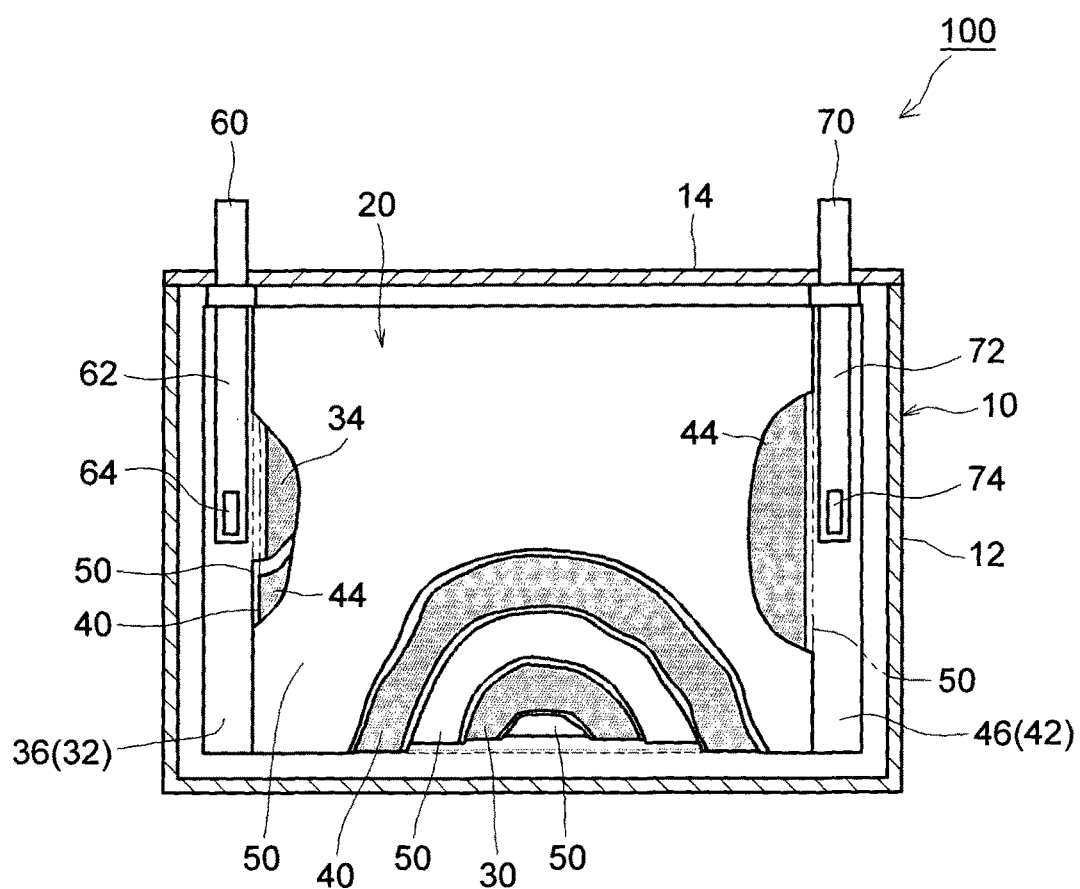
FIG. 2 is a sectional view taken along line II-II of FIG. 1.

FIG. 1 is a perspective view schematically showing a configuration of a nonaqueous electrolyte secondary battery according to an embodiment of the invention. FIG. 2 is a schematic diagram showing a cross-sectional structure taken along line II-II of FIG. 1. This nonaqueous electrolyte secondary battery 100 has a structure in which a battery case 10 accommodates a positive electrode 30, a negative electrode 40, and a nonaqueous electrolytic solution (not shown). Hereinafter, each component will be described using the lithium secondary battery 100 according to a preferred embodiment of the invention as an example. Typically, a separator 50 is provided between the positive electrode 30 and the negative electrode 40. Specifically, FIG.

3 is a diagram showing a state where the positive electrode 30, the negative electrode 40, and the separator 50 have an elongated shape and constitute a wound electrode body 20.

[Negative Electrode]

Figure 3:
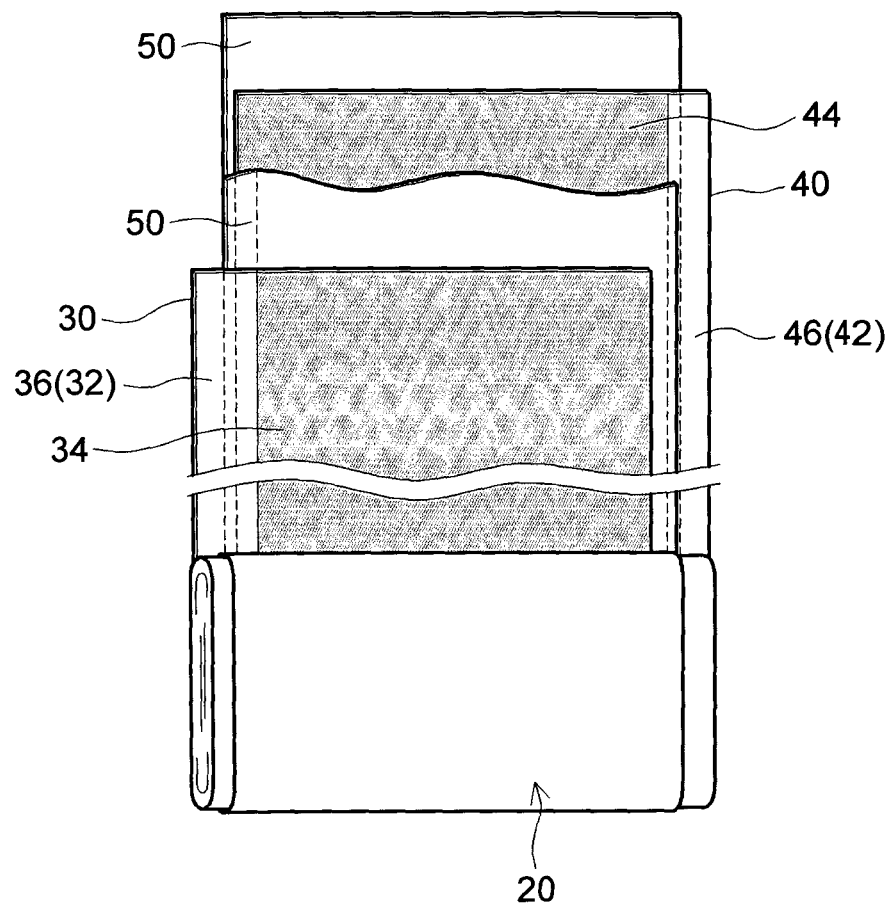
FIG. 3 is a schematic diagram showing a configuration of a wound electrode body of FIG. 2.

Typically, the negative electrode 40 includes: a negative electrode current collector 42; and a negative electrode active material layer 44 that is formed on the negative electrode current collector 42. In an example of FIGS. 2 and 3, the negative electrode active material layer 44 is provided on both surfaces of the negative electrode current collector 42. However, the negative electrode active material layer 44 may be provided on either one of the surfaces. In the negative electrode current collector 42, typically, two portions are provided, the two portions including: a portion where the negative electrode active material layer 44 is formed; and a negative electrode current collector exposure portion 46 where the negative electrode current collector 42 is exposed without the negative electrode active material layer 44 being provided. This negative electrode current collector exposure portion 46 is provided along an end portion of the negative electrode current collector 42. The negative electrode active material layer 44 is provided on the portion of the surface of the negative electrode current collector 42 other than the negative electrode current collector exposure portion 46.

This negative electrode active material layer 44 contains a negative electrode active material. Typically, the negative electrode active material layer 44 may be bonded to the negative electrode current collector 42 in a state where particles of the negative electrode active material bind to each other through a binder. Such a negative electrode 40 can be manufactured, for example, by dispersing the negative electrode active material and the binder in an appropriate solvent (for example, water or N-methyl-2-pyrrolidone, preferably water) to obtain a negative electrode paste, supplying the negative electrode paste to the surface of the negative electrode current collector 42, and then drying the negative electrode paste to remove the solvent. As the negative electrode current collector 42, a conductive member formed of highly conductive metal (for example, aluminum, copper, nickel, titanium, or stainless steel) can be preferably used.

As shown in FIG. 4, the negative electrode active material layer 44 has a first region R1 and a second region R2 which are classified in a thickness direction perpendicular to a surface of the negative electrode current collector 42. Here, the first region R1 is a region formed on the surface of the negative electrode current collector 42, and the second region R2 is a region including a surface of the negative electrode active material layer 44. The first region R1 contains LTO which is a negative electrode active material as a major component. The second region R2 contains LTO which is a negative electrode active material as a major component and further contains SiO.

Although it slightly varies depending on a nonaqueous solvent or the like, the potential (vs. Li/Li$^+$) of LTO (lithium titanium composite oxide) at which lithium ions are stored and released is constant at 1.5 V to 1.6 V (typically, 1.55 V) and is higher than that of other negative electrode active materials (typically, carbon materials). Therefore, even when a battery is charged at a high power input, the reduction decomposition of a nonaqueous electrolytic solution or the deposition of charge carriers (Li ions) is not likely to occur, and the capacity retention is high. Further, there is no volume change caused by the storage of charge carriers (Li ions), and safety and durability are superior. Moreover, since the potential at which lithium ions are stored and released is constant, a change in battery voltage caused by a change in state of charge (SOC) is reduced, and a change in output value can also be suppressed. Therefore, a non-aqueous electrolyte secondary battery in which LTO is used as a negative electrode active material can be charged to a high SOC at a high power input.

As LTO, any compound containing lithium (Li), titanium (Ti) and oxygen (O) as constituent elements can be used without any particular limitation. For example, an oxide represented by the formula $Li_xTi_yO$ (wherein x and y may be positive real numbers less than 1) may be used, and examples thereof include $Li_4Ti_5O_{12}$, $LiTi_2O_4$, and $Li_2Ti_3O_7$. Among these, a lithium titanate having a spinel structure represented by $Li_4Ti_5O_{12}$ can be preferably used. Here, in addition to an oxide containing Li and Ti as constituent metal elements, the lithium titanium composite oxide may further contain at least one metal element (substitutional constituent element) other than Li and Ti. For example, the metal element may be one element or two or more elements selected from the group consisting of magnesium (Mg), calcium (Ca), strontium (Sr), scandium (Sc), zirconium (Zr), vanadium (V), niobium (Nb), chromium (Cr), molybdenum (Mo), tungsten (W), manganese (Mn), iron (Fe), cobalt (Co), rhodium (Rh), nickel (Ni), palladium (Pd), platinum (Pt), copper (Cu), zinc (Zn), boron (B), aluminum (Al), gallium (Ga), indium (In), silicon (Si), germanium (Ge), tin (Sn), lanthanum (La), and cerium (Ce). A proportion of the substitutional constituent element is not particularly limited. For example, it is appropriate that a total proportion of substitutional constituent elements is adjusted to be 10 mass % or lower. As LTO, typically, well-known particles of LTO can be used without any particular limitation.

For example, when LTO is compared to a negative electrode active material of a carbon material, the average particle size of primary particles can be reduced to be about 1/100. As a result, the specific surface area can be increased, and the diffusion time of lithium ions in particles of LTO can be reduced. That is, the input and output speeds of lithium ions can be increased. As a result, the overvoltage of lithium ions during input and output can be reduced, and high input and output characteristics can be realized. The average primary particle size of LTO is preferably 1 µm or less, and more preferably 10 nm to 500 nm and may be, for example, 50 nm to 200 nm. The average particle size (secondary) of LTO is preferably 20 µm or less, and more preferably 0.1 µm to 15 µm and may be, for example, 1 µm to 10 µm.

In this specification, "average particle size" refers to a particle size (also referred to as "50% volume average particle size" or "median size") corresponding to a cumulative value of 50% in order from the smallest particle size in a volume particle size distribution which is obtained by using a laser diffraction scattering method. "Average primary particle size" can be defined as a circular equivalent arithmetic average value obtained from 100 or more particles which are measured by observation means such as an electron microscope.

The theoretical capacity of LTO is about 170 Ah/kg and is not so high. The reason is as follows. In the negative electrode active material layer 44 in which LTO particles are used as a negative electrode active material, as compared to a case where a carbon material is used as a negative electrode active material, the density is likely to be high, and the thickness of the negative electrode active material layer 44 can be made to be thick, which is a design for securing the coating weight. As a result, in the negative electrode active material layer 44 having a large thickness, it is difficult to smoothly perform the supply and circulation of a nonaqueous electrolytic solution. Accordingly, a nonaqueous electrolyte secondary battery of the related art in which LTO is used as a negative electrode active material is likely to be affected by non-uniformity in the concentration of an electrolyte in the thickness direction of the negative electrode active material layer during high-current (high-rate) charging. In other words, in the second region R2 including the surface of the negative electrode active material layer 44 in which Li ions are preferentially stored during high-rate charging, the salt concentration is likely to decrease.

In the technique disclosed herein, the first region R1 has a configuration in which the negative electrode active material layer 44 contains LTO as a major component; and the second region R2 contains LTO, which is a negative electrode active material, as a major component and further contains SiO. Here, "containing LTO as a major component" represents that the content of LTO in the negative electrode active material contained in each of the regions is 80 mass % or higher. The content of LTO in the first region R1 is preferably 90 mass % or higher, more preferably 95 mass % or higher, and still more preferably substantially 100 mass %. The content of LTO in the second region R2 is preferably 85 mass % or higher, more preferably 90 mass % or higher, and still more preferably 93 mass %.

Figure 4A:
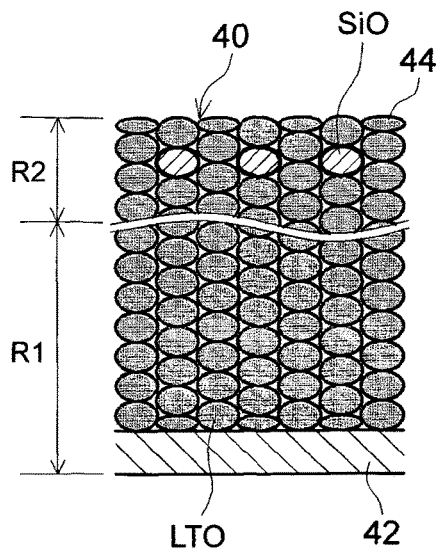
FIGS. 4A and 4B are schematic sectional views of a negative electrode.
Figure 4B:
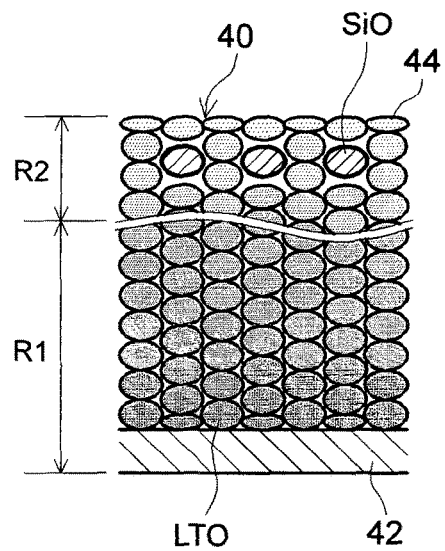

A large volume of silicon oxide (SiO) is contained in a material for alloying with lithium and is represented by the formula $SiO_x$ (0<X<2). It is known that SiO described herein has not a structure of an oxide of divalent Si (that is, $SiO_2$) but a composite structure in which Si nanoparticles (<20 nm) are dispersed in an amorphous matrix of $SiO_2$. Due to the storage and release of lithium ions, a relatively large volume change may occur. Accordingly, for example, when LTO (LTO particle groups) are mixed with SiO (SiO particles) as shown in FIG. 4A, the volume of SiO expands and shrinks during charging and discharging. As a result, as shown in FIG. 4B, pores are formed around SiO such that SiO can expand. Accordingly, in the second region R2, SiO is mixed with LTO. As a result, an additional supply space for a nonaqueous electrolytic solution can be secured at a position where an electrolyte is likely to be depleted. As a result, the depletion of an electrolyte in the second region R2 including the surface of the negative electrode active material layer 44 can be suppressed, and high energy density can be achieved.

The capacity of the secondary battery can be recognized based on the area of a portion where practical capacity (SOC) regions of the positive electrode and the negative electrode overlap each other. LTO can make charging and discharging to be performed in a wide SOC region. Here, for example, when a negative electrode formed of LTO is used in combination with a positive electrode in which lithium transition metal composite oxide is used as a positive electrode active material, a region where the resistance is extremely high during positive electrode discharging may be a practical SOC region. When charging and discharging is performed in this region, the resistance of a low SOC region is high. On the other hand, the theoretical capacity of SiO is extremely high at 1200 Ah/kg, but the initial irreversible capacity thereof is also extremely high. When the irreversible capacity of the negative electrode is high, during discharging, the negative electrode potential rapidly rises before the positive electrode potential rapidly decreases. At this time, discharging may end (negative electrode potential suppression). In the technique disclosed herein, by using LTO, which is a main negative electrode active material, in combination with SiO, the overall irreversible capacity of the negative electrode increases, and the end of discharging may be restricted by the negative electrode potential. As a result, the chargeable capacity (reversible capacity) of the positive electrode may be decreased. However, the voltage during the end of discharging of the positive electrode can be increased (that is, an increase in the SOC of the positive electrode). That is, the overall output of the battery in a low SOC region can be improved. By using SiO in combination with LTO, the Li storage capacity of the negative electrode can be increased. Therefore, even in an overcharge state, the thermal stability of the negative electrode can be improved without Li being deposited.

SiO may be contained in LTO particles in the form of particles. The average particle size of SiO is preferably equal to or more than that of LTO. Accordingly, the average particle size of SiO is preferably 1 μm to 50 μm and more preferably 5 μm to 30 μm and may be, for example, 10 μm to 20 μm. As SiO, well-known SiO compounds can be used without any particular limitation.

As the binder, binders which are used in a negative electrode of a common lithium ion secondary battery can be appropriately adopted. For example, when the negative electrode active material layer 44 is formed by supplying a paste, a polymer which can be uniformly dissolved or dispersed in a solvent constituting the paste can be used as the binder. When a nonaqueous (solvent-based) paste is used, a polymer material which can be dissolved in an organic solvent, for example, a vinyl halide resin such as polyvinylidene fluoride (PVDF) or a polyvinylidene chloride (PVDC), or a polyalkylene oxide such as polyethylene oxide (PEO) can be used. In addition, when an aqueous paste (paste which can be diluted with water) is used, a water-soluble polymer material or a water-dispersible (which can be dispersed in water) polymer material can be preferably adopted. Examples of the water-soluble or water-dispersible polymer include polytetrafluoroethylene (PTFE), carboxymethyl cellulose (CMC), and styrene-butadiene rubber (SBR). As a dispersion medium of the negative electrode active material, an aqueous solvent can be preferably used. Accordingly, when an aqueous solvent is used to form the negative electrode active material layer 44, rubbers such as styrene-butadiene rubber (SBR); and water-soluble or water-dispersible polymer materials such as polyethylene oxide (PEO) or vinyl acetate copolymers can be preferably used. Among these, SBR is more preferably used. The above-described exemplary polymer materials may be used not only as the binder but also as a thickener of the above-described paste or other additives.

A ratio of the mass of the negative electrode active material to the total mass of the negative electrode active material layer 44 is suitably about 50 mass % or more and is usually preferably about 90 mass % to 99 mass % (for example, 95 mass % to 99 mass %). As a result, high energy density can be realized. When the binder is used, a ratio of the mass of the binder to the total mass of the negative electrode active material layer 44 is, for example, about 1 mass % to 10 mass % and is usually preferably about 1 mass % to 5 mass %. As a result, the mechanical strength (shape retaining ability) of the negative electrode active material layer 44 can be suitably secured, and superior durability can be realized. When the thickener is used, a ratio of the mass of the thickener to the total mass of the negative electrode active material layer 44 is, for example, about 1 mass % to 10 mass % and is usually preferably about 1 mass % to 5 mass %.

In the technique disclosed herein, the mass (that is, coating weight) per unit area of the negative electrode active material layer in the first region R1 is preferably 30 mg/cm² to 50 mg/cm². With such a configuration, the battery can be charged and discharged at a high current. The coating weight is more preferably 30 mg/cm² to 45 mg/cm², and still more preferably 35 mg/cm² to 40 mg/cm². The coating weight of the negative electrode active material layer (the total coating weight of LTO, SiO, the binder and the like) in the second region is preferably set to be the same as the coating weight in the first region.

For example, the contents of LTO and SiO in the second region R2 satisfy the following relationship of $1 \leq M^2_{SiO}/(M^2_{LTO}+M^2_{SiO}) \times 100 \leq 7$, wherein $M^2_{LTO}$ represents the content of LTO in the second region (R2) in terms of mass %, and $M^2_{SiO}$ represents the SiO content in the second region (R2) in terms of mass %. Here, when $M^2_{SiO}$ exceeds 0, an effect of improving input characteristics can be exhibited. However, by setting $M^2_{SiO}$ to be 1 (mass %) or higher, the effect of improving input characteristics can be clearly exhibited, which is preferable. $M^2_{SiO}$ is more preferably 2 (mass %) or higher and still more preferably 3 (mass %) or higher. However, the excessive addition of SiO may cause a decrease in capacity, which is not preferable. From this point of view, about 10 (mass %) or lower can be set as a reference value of $M^2_{SiO}$. For example, when a ratio of the second region R2 to the negative electrode active material layer 44 is increased (for example, 50%) by increasing the thickness of the second region R2, $M^2_{SiO}$ is, for example, preferably 7 (mass %) or lower and more preferably 6 (mass %) or lower. When the ratio of the second region R2 to the negative electrode active material layer 44 is reduced (for example, 10%), $M^2_{SiO}$ can be appropriately adjusted, for example, with about 10 (mass %) or lower as a reference value. It is not necessary that SiO is uniformly added to LTO in the second region R2. For example, a large amount of SiO may be contained in a region where the salt concentration is likely to be low (that is, a region near the surface of the negative electrode active material layer 44). In this case, the SiO content may gradually increase in a stepless manner or in a stepwise manner toward the surface of the negative electrode active material layer 44.

A ratio of the average thickness of the second region R2 to the average thickness of the negative electrode active material layer 44 can be made to be 1% to 50%. Here, when the ratio of the thickness of the second region R2 exceeds 0, an effect of improving input characteristics can be exhibited. However, when the second region R2 includes a region of the negative electrode active material layer 44 where the salt concentration is low, input characteristics can be improved reliably and efficiently. Accordingly, the ratio of the thickness of the second region R2 is preferably 10% or higher, more preferably 20% or higher, and still more preferably 25% or higher. Although it also depends on the SiO content, it is not preferable to set an excessively large area of the second region R2 because a decrease in capacity may occur. From this point of view, the ratio of the thickness of the second region R2 is preferably 45% or lower and may be, for example, 30% or lower.

By appropriately pressing the negative electrode active material layer 44, the thickness and density of the negative electrode active material layer 44 can be adjusted. In addition, the thickness of the negative electrode active material layer 44 after being pressed is, for example, 20 μm or more and typically 50 μm or more and is, for example, 300 μm or less and typically 250 μm or less.

The negative electrode active material layer 44 can be manufactured using, for example, the following method (1) including: supplying a first negative electrode paste which contains materials constituting the first region R1 to the surface of the negative electrode current collector 42 to form the first region R1 thereon; and then supplying a second negative electrode paste which contains materials constituting the second region R2 to the first region R1 to form the second region R2 thereon. Alternatively, since SiO has a relatively low density, the following method (2) can also be used, the method (2) including: supplying a negative electrode paste which contains materials constituting the first region R1 and the second region R2 to the surface of the negative electrode current collector 42; and migrating SiO from the negative electrode paste to the second region R2.

As can be seen from the above description, depending on the method of manufacturing the negative electrode 40, the first region R1 and the second region R2 may be distinguished from each other through a clear boundary (interface) or are not necessarily distinguished from each other through a clear boundary or the like. The reason for this is as follows: according to the method (2) of manufacturing the negative electrode, the possibility of SiO being contained in the first region R1 cannot be removed. That is, it can be considered that the first region R1 and the second region R2 have the following configuration: in a broad sense, the SiO content increases from the first region side of the negative electrode current collector 42 toward the second region R2 side of the negative electrode active material layer 44 within the range not departing from the scope of the invention. Accordingly, the cross-section of the negative electrode active material layer 44 in the thickness direction can be classified into the second region R2 having a relatively high SiO content and the first region R1 having a relatively low SiO content. Since SiO has a large volume change caused by charging and discharging, a configuration in which the first region R1 contains substantially no SiO is more preferable.

The presence of the first region and the second region in the thickness direction of the negative electrode active material layer 44 can be verified using, for example, a general scanning electron microscope (SEM) and energy dispersive X-ray spectroscopy (EDX)). More specifically, a cross-sectional image in the thickness direction of the negative electrode active material layer which is obtained by SEM observation is analyzed (mapped) using EDX. As a result, a distribution state of elements (for example, Si) constituting the negative electrode active material layer is measured. Based on the distribution result, an interface between the first region R1 and the second region R2 can be determined, and the thickness of each region, the SiO content in the second region R2, and the like can be calculated. In the analysis, it is preferable that an arithmetic mean value of the results (for example, SiO concentration) of performing the measurement at arbitrary positions (typically 10 positions to 30 positions) of the negative electrode active material layer is adopted.

[Positive Electrode]

The positive electrode 30 includes: a positive electrode current collector 32; and a positive electrode active material layer 34 that is formed on a single surface or both surfaces of the positive electrode current collector 32. In the positive electrode current collector 32, two portions are provided, the two portions including: a portion where the positive electrode active material layer 34 is formed; and a positive electrode current collector exposure portion 36 where the positive electrode current collector 32 is exposed without the positive electrode active material layer 34 being provided. This positive electrode current collector exposure portion 36 is provided at an end portion of the positive electrode current collector 32. The positive electrode active material layer 34 is provided on the portion of the surface of the positive electrode current collector 32 other than the positive electrode current collector exposure portion 36.

This positive electrode active material layer 34 contains a positive electrode active material. Typically, the positive electrode active material layer 34 may be bonded to the positive electrode current collector 32 in a state where particles of the positive electrode active material and a conductive material bind to each other through a binder. Typically, the positive electrode 30 can be manufactured using a method including: dispersing the positive electrode active material, the conductive material, and the binder in an appropriate solvent to prepare a positive electrode paste (including a slurry, an ink, and the like); supplying the positive electrode paste to the surface of the positive electrode current collector 32 other than the positive electrode current collector exposure portion 36; and drying the positive electrode paste to remove the solvent therefrom. As the positive electrode current collector 32, a conductive member formed of highly conductive metal (for example, aluminum, nickel, titanium, or stainless steel) can be preferably used.

As the positive electrode active material, a lithium-containing compound (for example, lithium transition metal composite oxide) containing lithium and one kind or two or more kinds of transition metal elements can be preferably used, in which the lithium-containing compound is a material capable of storing and releasing lithium ions. Preferable examples of the positive electrode active material include lithium transition metal oxides having a layered rock-salt type or spinel-type crystal structure. Examples of lithium transition metal oxide include lithium nickel composite oxide (for example, $LiNiO_2$), lithium cobalt composite oxide (for example, $LiCoO_2$), lithium manganese composite oxide (for example, $LiMn_2O_4$), and a ternary lithium-containing composite oxide such as lithium nickel cobalt manganese composite oxide (for example, $LiNi_{1/3}Co_{1/3}Mn_{1/3}O_2$). In addition, as the positive electrode active material, a polyanion-based compound (for example, $LiFePO_4$, $LiMnPO_4$, $LiFeVO_4$, $LiMnVO_4$, $Li_2FeSiO_4$, $Li_2MnSiO_4$, or $Li_2CoSiO_4$) represented by a formula of $LiMPO_4$, $LIMVO_4$, or $Li_2MSiO_4$ (wherein M represents at least one element selected from among Co, Ni, Mn, and Fe) may be used.

The conductive material is not particularly limited to a specific conductive material as long as it is used in a lithium ion secondary battery of the related art. For example, a carbon material such as carbon powder or carbon fiber can be used. As the carbon powder, for example, carbon powders of various carbon blacks (for example, acetylene black, furnace black, and Ketjen black) and graphite powder can be used. Among these, powder of acetylene black (AB) is preferably used as the carbon powder. Among these conductive materials, one kind can be used alone, or two or more kinds can be appropriately used in combination.

As the binder, binders which are used in a positive electrode of a common lithium ion secondary battery can be appropriately adopted. For example, the same polymers as those which can be contained in the negative electrode 40 can be used as the binder. As a dispersion medium of the positive electrode active material, a nonaqueous solvent can be preferably used. Therefore, when a nonaqueous solvent is used to form the positive electrode active material layer 34, a polymer material which can be dissolved in an organic solvent, for example, a vinyl halide resin such as polyvinylidene fluoride (PVDF) or a polyvinylidene chloride (PVDC), or a polyalkylene oxide such as polyethylene oxide (PEO) can be preferably used. The above-described exemplary polymer materials may be used not only as the binder but also as a thickener of the above-described paste or other additives.

As the solvent for dissolving the constituent materials of the above-described positive electrode active material layer 34, any one of an aqueous solvent and a nonaqueous solvent (organic solvent) can be used as long as it has properties corresponding to the properties of the binder used. For example, as the aqueous solvent, water or a mixed solvent containing water as a major component can be used. As a solvent constituting the mixed solvent other than water, one kind or two or more kinds of organic solvents (for example, lower alcohols or lower ketones) which can be uniformly mixed with water can be used. As the nonaqueous solvent, for example, N-methyl-2-pyrrolidone (NMP) can be preferably used.

A ratio of the mass of the positive electrode active material to the total mass of the positive electrode active material layer 34 is suitably about 60 mass % or more (typically, 60 mass % to 99 mass %) and is usually preferably about 70 mass % to 95 mass %. When the binder is used, a ratio of the mass of the binder to the total mass of the positive electrode active material layer is, for example, about 0.5 mass % to 10 mass % and is usually preferably about 1 mass % to 5 mass %. When the conductive material is used, a ratio of the mass of the conductive material to the total mass of the positive electrode active material layer is, for example, about 1 mass % to 20 mass % and is usually preferably about 2 mass % to 10 mass %. In addition, the thickness of the positive electrode active material layer 34 is, for example, 20 μm or more and typically 50 μm or more and is, for example, 200 μm or less and typically 100 μm or less. In addition, the density of the positive electrode active material layer 34 is not particularly limited, but is, for example, 1.5 g/cm$^3$ or more and typically 2 g/cm$^3$ or more and is, for example, 4.5 g/cm$^3$ or less and typically 4.2 g/cm$^3$ or less. The positive electrode active material layer satisfying the above-described range can realize high battery performance (for example, high energy density and output density).

[Separator]

The separator 50 is a constituent material that insulates the positive electrode 30 and the negative electrode 40 and can allow the permeation of charge carriers. Typically, the separator 50 is arranged between the positive electrode active material layer 34 and the negative electrode active material layer 44. The separator 50 can be configured to have a function of storing the nonaqueous electrolytic solution and a shutdown function. As the separator 50, a microporous resin sheet formed of a resin such as polyethylene (PE), polypropylene (PP), polyester, cellulose, or polyamide can be preferably used. Among these, a microporous sheet formed of a polyolefin resin such as PE or PP is preferably used because it can set a shutdown temperature to be in a preferable range of 80° C. to 140° C. (typically 110° C. to 140° C.; for example, 120° C. to 135° C.). The separator 50 may have a single-layer structure of a sheet-shaped resin material alone; or a structure in which two or more sheet-shaped resin materials formed of different materials and having different properties (for example, average thickness or porosity) are laminated (bonded) (for example, a three-layer structure in which a PP layer is laminated on both surfaces of a PE layer).

The average thickness of the separator 50 is not particularly limited, but is usually 10 μm or more and typically 15 μm or more (for example, 17 μm or more). In addition, the upper limit is usually 40 μm or less and typically 30 μm or less (for example, 25 μm or less). By adjusting the average thickness of the separator 50 to be within the above-described range, the permeability of charge carriers can be maintained to be superior, and small short-circuit (leakage current) is not likely to occur. Therefore, input and output densities and safety can be simultaneously realized at a high level. In addition, a heat resistance layer (HRL) formed of insulating inorganic particles can be formed on the surface of the separator 50.

[Nonaqueous Electrolytic Solution]

As the nonaqueous electrolytic solution, typically, a solution in which a supporting electrolyte (for example, a lithium salt, a sodium salt, or a magnesium salt; in a lithium ion secondary battery, a lithium salt) is dissolved or dispersed in a nonaqueous solvent can be used. As the nonaqueous solvent, various organic solvents which can be used in an electrolytic solution of a general nonaqueous electrolyte secondary battery. For example, carbonates, ethers, esters, nitriles, sulfones, and lactones can be used without any limitation. Specific examples of the nonaqueous solvent include ethylene carbonate (EC), propylene carbonate (PC), diethyl carbonate (DEC), dimethyl carbonate (DMC), and ethyl methyl carbonate (EMC). Among these nonaqueous solvents, one kind can be used alone, or a mixed solvent of two or more kinds can be used. The supporting electrolyte can be selected among various supporting electrolytes which are used in a general nonaqueous electrolyte secondary battery. Specific examples of the supporting electrolyte include lithium salts such as $LiPF_6$, $LiBF_4$, $LiClO_4$, $LiAsF_6$, $Li(CF_3SO_2)_2N$, and $LiCF_3SO_3$. Among these supporting electrolytes, one kind can be used alone, or two or more kinds can be used in combination. It is preferable that the concentration of the supporting electrolyte in the nonaqueous electrolytic solution is adjusted to be in a range of 0.7 mol/L to 1.3 mol/L.

The nonaqueous electrolytic solution may further contain various additives as long as the characteristics of the nonaqueous electrolyte secondary battery according to the invention do not deteriorate. These additives are used as a film forming agent, an overcharge additive, and the like for one or two or more of the purposes including: the improvement of the input and output characteristics of the battery; the improvement of cycle characteristics; the improvement of an initial charge-discharge efficiency; and the improvement of safety. Examples of the additives include a film forming agent such as lithium bis(oxalato)borate (LiBOB), vinylene carbonate (VC), vinyl ethylene carbonate (VEC), or fluoroethylene carbonate (FEC); an overcharge additive formed of a compound which may produce gas during overcharge, the additive being represented by an aromatic compound such as biphenyl (BP) or cyclohexylbenzene (CHB); a surfactant; a dispersant; and a thickener. The concentrations of these additives in the entire nonaqueous electrolytic solution vary depending on the kind of the additive. For example, the concentration of the film forming agent is usually 0.1 mol/L or less (typically, 0.005 mol/L to 0.05 mol/L), and the concentration of the overcharge additive is usually 6 mass % or less (typically, 0.5 mass % to 4 mass %).

[Battery Case]

The above-prepared electrode body is accommodated in the predetermined battery case 10. The battery case 10 can be formed of a material and has a shape according to the purpose, the material and the shape being used in a non-aqueous electrolyte secondary battery of the related art. Examples of the material of the battery case 10 include a metal material such as aluminum or steel; and a resin material such as a polyphenylene sulfide resin or a polyimide resin. Among these, a relatively light-weight metal (for example, aluminum or an aluminum alloy) can be preferably used from the viewpoint of, for example, improving heat dissipation and energy density. The shape of the battery case (external shape of the container) is not particularly limited and is, for example, a circular shape (a cylindrical shape, a coin shape, or a button shape), a hexahedron shape (a cuboid shape or a cube shape), a bag shape, or a shape obtained by processing and modifying the above-described shape.

In the nonaqueous electrolyte secondary battery 100 disclosed herein, as described above, non-uniformity in the temperature of the wound electrode body 20 during overcharge is suppressed. Therefore, during overcharge, charging can be stopped safely and rapidly by using, for example, the shutdown function of the separator. Accordingly, in the battery case, a safety mechanism such as a CID which can interrupt the current when sensing an increase in the internal pressure of the battery during overcharge is not necessarily provided.

Typically, the battery case 10 includes a case body (external case) 12 that accommodates the wound electrode body 20 and the nonaqueous electrolytic solution; and a sealing lid 14 that covers an opening of the case body 12. In an example of FIG. 1, the battery case 10 is formed of an aluminum alloy and has a thin square shape (cuboid shape) is shown. This battery case 10 is formed of a combination including: the case body 12 having a bottomed box shape that has an opening on one surface of the cuboid; and the sealing lid 14 having a plate shape that blocks the opening. In the sealing lid 14, a positive electrode terminal 60, which is electrically connected to the positive electrode 30 of the wound electrode body 20, and a negative electrode terminal 70, which is electrically connected to the negative electrode 40 of the wound electrode body 20, are provided. In addition, in the sealing lid 14, typically, an injection hole (not shown) is formed through which the nonaqueous electrolytic solution is inserted into the case body 12 that accommodates the wound electrode body 20. Further, as in the case of a lithium ion secondary battery of the related art, the sealing lid 14 may further include a safety valve for discharging gas, produced from the inside of the battery case 10, to the outside of the battery case 10 during an abnormal situation of the battery.

During the assembly of the secondary battery, typically, the wound electrode body 20 is accommodated in the case body 12 in a state of being fixed to the sealing lid 14. For example, the positive electrode current collector exposure portion 36 of the wound electrode body 20 can be electrically connected to the positive electrode terminal 60 (for example, which is formed of aluminum) through a positive electrode current collector member 62. Likewise, the negative electrode current collector exposure portion 46 can be electrically connected to the negative electrode terminal 70 (for example, which is formed of nickel) through a negative electrode current collector member 72. The positive and negative electrode current collector members 62, 72, the positive and negative electrode terminals 60, 70, and the positive and negative electrode current collectors 32, 42 are joined to each other by, for example, ultrasonic welding or resistance welding. Next, the opening of the case body 12 is sealed with the sealing lid 14. As a result, the secondary battery 100 can be constructed. The sealing lid 14 and the case body 12 can be joined to each other, for example, by welding. As a result, the nonaqueous electrolyte secondary battery 100 disclosed herein is provided.

The nonaqueous electrolyte secondary battery disclosed herein can be used for various applications and is characterized in that superior input and output characteristics can be exhibited in a wide range of temperatures. Therefore, the nonaqueous electrolyte secondary battery can be preferably used in applications where high energy density and input and output densities are required in a wide range of wide range of temperatures. Examples of the applications include a power source (driving power supply) for a vehicle-mounted motor. The type of the vehicle is not particularly limited, and examples thereof include a plug-in hybrid vehicle (PHV), a hybrid vehicle (HV), an electric vehicle (EV), an electric truck, a motorized bicycle, an electric assist bicycle, an electric wheelchair, and an electric railway. This nonaqueous electrolyte secondary battery may be used in the form of a battery pack in which plural secondary batteries are connected to each other in series and/or in parallel.

Hereinafter, several examples relating to the invention will be described, but the examples are not intended to limit the invention.

[Construction of Nonaqueous Electrolyte Secondary Battery]

[Preparation of Positive Electrode]

Li[$Ni_{1/3}Co_{1/3}Mn_{1/3}$]$O_2$ powder (LNCM) having an average particle size of 6 μm as a positive electrode active material; polyvinylidene fluoride (PVdF) as a binder; and acetylene black (AB) as a conductive material were weighed at a mass ratio (LNCM:PVdF:AF=94:3:3). The weighed materials were mixed with N-methylpyrrolidone (NMP) such that the solid content concentration was about 50 mass %. As a result, a slurry for forming a positive electrode active material layer was prepared. This slurry was applied to regions of both surfaces of elongated aluminum foil (positive electrode current collector) having a thickness of about 15 μm such that the coating weight thereof per single surface was 17 mg/$cm^2$ (in terms of solid content), the regions ranging from ends of the surfaces to positions at a distance of 94 mm from the ends in the longitudinal direction. The remaining region was left as a positive electrode current collector exposure portion, and the slurry was dried. As a result, a positive electrode active material layer was formed. Next, the positive electrode active material layer was rolled such that the total thickness of the positive electrode was 122 μm. As a result, a sheet-shaped positive electrode in which the positive electrode active material layer having a density of 3.2 g/$cm^3$ was formed on the positive electrode current collector was prepared. This sheet was cut into a positive electrode having a length of 4500 mm.

[Preparation of Negative Electrode]

First, lithium titanate (LTO; $Li_4Ti_5O_{12}$) having an average particle size of 8 μm as a negative electrode active material; acetylene black (AB) as a conductive material; styrene-butadiene rubber (SBR) as a binder; and carboxymethyl cellulose (CMC) as a thickener were weighed at a mass ratio (LTO:AB:SBR:CMC=93:5:1:1). The weighed materials were mixed with ion exchange water such that the solid content concentration was about 45 mass %. As a result, a slurry for forming a first region was prepared.

Next, a slurry for forming a second region was prepared under the same conditions as those of the slurry for forming a first region, except that not only LTO described above but also silicon oxide (SiO) were prepared as a negative electrode active material; and a ratio of the mass of SiO to the total mass of LTO and SiO was 0 (Example 1), 2 (Example 2), 4 (Example 3), 6 (Example 4), or 8 (Example 5).

This above-prepared slurry for forming a first region was applied to regions of both surfaces of elongated aluminum foil (negative electrode current collector) having a thickness of about 15 μm such that the coating weight thereof per single surface was 12 mg/$cm^2$ (in terms of solid content), the regions ranging from ends of the surfaces to positions at a distance of 100 mm from the ends in the longitudinal direction. The remaining region was left as a negative electrode current collector exposure portion, and the slurry was dried (drying temperature: 120° C., for 1 min). As a result, a first region of the negative electrode active material layer was formed. Next, the slurry for forming a second region was applied to the first region such that the coating weight thereof per single surface was 12 mg/$cm^2$ (in terms of solid content), and then was dried (drying temperature: 120° C., for 1 min). As a result, a second region of the negative electrode active material layer was formed. That is, in the embodiment, a ratio of the thickness of the second region to the thickness of the first region was 1:1. Next, the negative electrode active material layer was rolled such that the total thickness of the negative electrode was 217 μm. As a result, a sheet-shaped negative electrode in which the negative electrode active material layer having a density of 2.0 g/$cm^3$ was formed on the negative electrode current collector was prepared. This sheet was cut into a negative electrode having a length of 4700 mm.

[Preparation of Lithium Ion Secondary Battery]

The positive electrode sheet and the negative electrode sheet cut as described above were disposed to overlap each other with two separators interposed therebetween, and the obtained laminate was wound in an elliptical shape in cross-section. At this time, the positive electrode and the negative electrode were arranged such that the negative electrode active material layer covered the positive electrode active material layer in the width direction and such that the positive electrode current collector exposure portion and the negative electrode current collector exposure portion protruded to different sides in the width direction. As the separator, a microporous sheet having a thickness of 20 μm and a three-layer structure of polypropylene (PP)/polyethylene (PE)/polypropylene (PP) was used. The wound body was pressed into a flat shape with a flat plate at a pressure of 4 kN/$cm^2$ and at a normal temperature (25° C.) for 2 minutes. As a result, a wound electrode body was obtained. Next, a positive electrode terminal and a negative electrode terminal were attached to a sealing lid of a battery case, and these terminals were respectively welded to the positive electrode current collector exposure portion and the negative electrode current collector exposure portion, protruding from the wound electrode body, through current collector terminals. The wound electrode body connected to the sealing lid was put into an aluminum square battery case body through an opening thereof, and the opening and the sealing lid were welded.

As the nonaqueous electrolytic solution, a solution was used in which $LiPF_6$ as a supporting electrolyte was dissolved in a mixed solvent at a concentration of 1.0 mol/L, the mixed solvent containing ethylene carbonate (EC), dimethyl carbonate (DMC), and ethyl methyl carbonate (EMC) at a volume ratio (EC:DMC:EMC) of 3:4:3. In addition, 125 g of the nonaqueous electrolytic solution was injected to the battery case through an injection hole provided in the lid. In this way, lithium ion batteries of Examples 1 to 5 (theoretical capacity: 24.0 Ah) were constructed.

[Conditioning]

Each of the constructed batteries of the examples underwent conditioning according to the following Steps 1 and 2.

[Step 1]: the battery was charged at a constant current of 1 C in an environment of 25° C. until the battery voltage reached 2.7 V, and then the operation was stopped for 5 minutes.

[Step 2]: After Step 1, the battery was charged at a constant voltage for 1.5 hours, and then the operation was stopped for 5 minutes.

[Input Evaluation]

Figure 5:
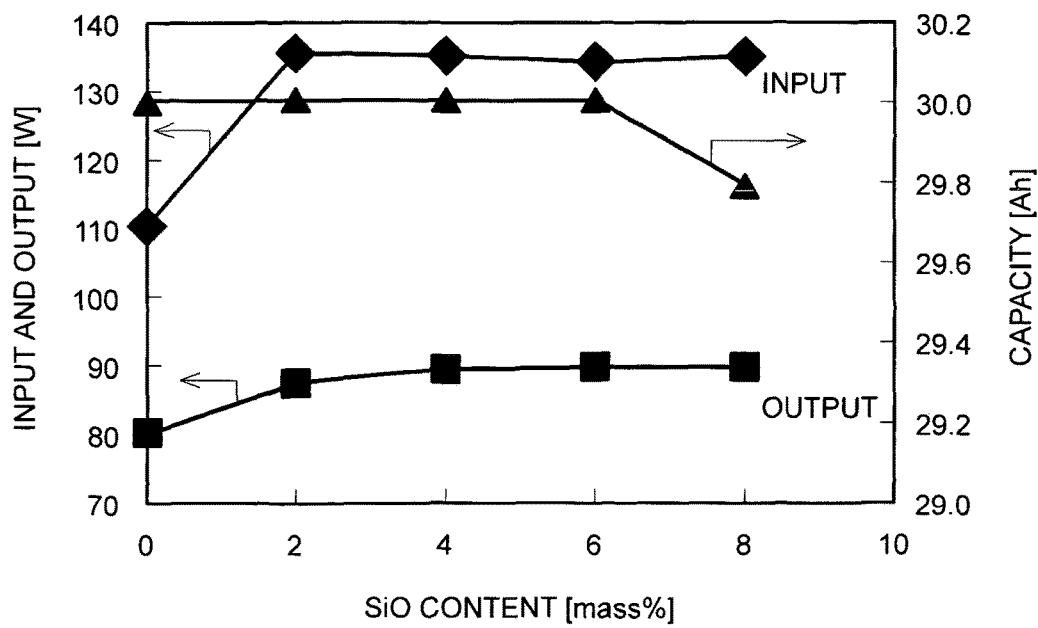
FIG. 5 is a graph showing a relationship between the SiO content in a first region of a battery of each of Examples and input characteristics, output characteristics, and capacity.

After the conditioning, the battery was charged at a constant low input value of 100 W, 150 W, or 200 W in an environment of −10° C. At this time, the time required until the battery voltage reached 2.7 V from the start of charging was measured. Based on a relationship between the time taken to reach 2.7 V and the input value at that time, a maximum input value at which the battery voltage can reach 2.7 V in 5 seconds was calculated. The results are shown in FIG. 5.

[Output Evaluation]

After the conditioning, the battery was discharged at a constant low output value of 80 W, 100 W, or 120 W in an environment of −10° C. At this time, the time required until the battery voltage reached 1.5 V from the start of discharging was measured. Based on a relationship between the time taken to reach 1.5 V and the output value at that time, a maximum output value at which the battery voltage can reach 1.5 V in 5 seconds was calculated. The results are shown in FIG. 5.

[Capacity Measurement]

In an environment of 25° C., the battery underwent CC-charging at 30 A until the battery voltage reached 2.7 V, underwent CV charging until the total charging time reached 5 hours, and then was discharged at 30 A for 3 hours until the battery voltage reached 1.5 V. At this time, the battery capacity was measured. The results are shown in FIG. 5.

Since the negative electrode active material layer containing LTO as a major component had a high potential, the density was relatively high and the coating weight was high in order to cause a high current to flow. In the negative electrode active material layer containing LTO as a major component, it was difficult to cause the nonaqueous electrolytic solution to flow through the entire region of the negative electrode active material layer, and the diffusion resistance is likely to increase in a low-temperature region (in this case, an environment of −10° C.). More specifically, for example, in the battery of Example 1, Li ions were preferentially stored in the second region near the surface of the negative electrode active material layer, and non-uniformity (thinning of the electrolyte) in salt concentration may occur in the second region. On the other hand, as shown in FIG. 5, in the batteries of Examples 2 to 5, SiO was added to the second region near the surface of the negative electrode active material layer. Due to the expansion and shrinkage of SiO, pores were formed around SiO in the second region, and a large amount of the nonaqueous electrolytic solution was able to be secured. As a result, it is considered that the depletion of the salt concentration in the second region was solved and input characteristics were improved.

It can be seen from FIG. 5 that, even when the SiO content in the second region is extremely low (exceeding 0 mass %), an effect of improving input characteristics is exhibited. It can also be seen that the effect can be obtained reliably by adjusting the SiO content to be 2 mass % or higher. In regard to output characteristics, it can be seen that an effect of improving output characteristics is exhibited with the addition of an extremely small amount (exceeding 0 mass %) of SiO; and this effect can be obtained reliably by the addition of 2 mass % or higher of SiO. The reason for this is presumed to be as follows. Since the irreversible capacity of SiO was high, there is a so-called difference in capacity between the positive and negative electrodes. As a result, the practical SOC region of the positive electrode facing the negative electrode was increased during output.

In regard to capacity, SiO has a high theoretical capacity but has a high irreversible capacity. Therefore, Li is deactivated. In the embodiment, it was found that, when the addition amount of SiO is increased to be 8 mass % or higher exceeding 6 mass %, the capacity of the battery is reduced. Therefore, it can be said that, although it depends on the ratio of the thickness of the second region, it is preferable that the addition amount of SiO is suppressed to be 7 mass % or lower. It can be understood from the embodiment that, when the ratio of the thickness of the second region is low, a decrease in capacity can be suppressed to be small.

As described above, according to the configuration disclosed herein, in a negative electrode active material layer in which it is necessary that the density is high and that the coating weight is high due to the intrinsic characteristics of LTO, a pore structure of a surface region where the storage of charge carrier (Li ions) is concentrated can be suitably adjusted. As a result, local non-uniformity in salt concentration is prevented, and a nonaqueous electrolyte secondary battery having superior energy density, durability, and safety can be realized. Hereinabove, specific examples of the invention have been described in detail. However, these examples are merely exemplary and do not limit the claims. The technique described in the claims includes various modifications and alternations of the above-described specific examples.

What is claimed is:

1. A nonaqueous electrolyte secondary battery characterized by comprising:
    a positive electrode;
    a nonaqueous electrolytic solution; and
    a negative electrode, the negative electrode including a negative electrode current collector and a negative electrode active material layer which is formed on the negative electrode current collector,
    the negative electrode active material layer having a first region and a second region,
    the first region being a region formed on a surface of the negative electrode current collector and contains lithium titanium composite oxide as a major component, and
    the second region being a region including a surface of the negative electrode active material layer and contains lithium titanium composite oxide as a major component and further mixes with silicon oxide, wherein
    a content of silicon oxide in the first region and $M^2_{SiO}$ satisfy the following relationship:

$$M^1_{SiO} < M^2_{SiO}$$

wherein $M^1_{SiO}$ represents the content of silicon oxide in the first region in terms of mass %, $M^2_{SiO}$ represents the content of silicon oxide in the second region in terms of mass %.

2. The nonaqueous electrolyte secondary battery according to claim 1, wherein
    a ratio of an average thickness of the second region to an average thickness of the negative electrode active material layer is 1% to 50%.

3. The nonaqueous electrolyte secondary battery according to claim 1, wherein a content of lithium titanium composite oxide in the second region and a content of silicon oxide in the second region satisfy the following relationship:

$$1 < M^2_{SiO}/(M^2_{LTO} + M^2_{SiO}) \times 100 \leq 7$$

wherein $M^2_{LTO}$ represents the content of lithium titanium composite oxide in the second region in terms of mass %.

4. The nonaqueous electrolyte secondary battery according to claim 1, wherein
a mass per unit area of the negative electrode active material layer in the first region is 30 mg/cm$^2$ to 50 mg/cm$^2$.

5. The nonaqueous electrolyte secondary battery according to claim 1, wherein
an overall density of the negative electrode active material layer is 2 g/cm$^3$ to 3 g/cm$^3$.

6. The nonaqueous electrolyte secondary battery according to claim 1, wherein
the first region contains silicon oxide.

7. The nonaqueous electrolyte secondary battery according to claim 1, characterized in that
the content of silicon oxide in the first region is zero.

* * * * *